United States Patent [19]

Quirk

[11] Patent Number: 5,798,418
[45] Date of Patent: Aug. 25, 1998

[54] STAR POLYMERS FROM MIXED INITIATORS

[75] Inventor: Roderic P. Quirk, Akron, Ohio

[73] Assignee: FMC Corporation, Philadelphia, Pa.

[21] Appl. No.: 683,487

[22] Filed: Jul. 18, 1996

[51] Int. Cl.⁶ .............................. C08F 297/04; C08F 6/00
[52] U.S. Cl. ..................... 525/314; 525/272; 526/173; 526/181; 502/157; 568/659
[58] Field of Search ....................... 525/314, 272; 526/173, 181; 502/157; 568/659

[56] References Cited

U.S. PATENT DOCUMENTS

| | | |
|---|---|---|
| 3,280,084 | 10/1966 | Zelinski et al. |
| 3,326,881 | 6/1967 | Uraneck et al. |
| 3,639,517 | 2/1972 | Kitchen et al. |
| 3,776,964 | 12/1973 | Morrison et al. |
| 3,842,146 | 10/1974 | Milkovich et al. |
| 3,862,100 | 1/1975 | Halasa et al. |
| 3,954,894 | 5/1976 | Kamienski et al. |
| 3,985,830 | 10/1976 | Fetters et al. |
| 4,039,593 | 8/1977 | Kamienski et al. |
| 4,994,526 | 2/1991 | Peters. |
| 5,310,490 | 5/1994 | Struglinski et al. |
| 5,310,814 | 5/1994 | Struglinski et al. |
| 5,331,058 | 7/1994 | Shepherd et al. |
| 5,362,699 | 11/1994 | Shepherd et al. |
| 5,376,745 | 12/1994 | Handlin, Jr. et al. |
| 5,391,663 | 2/1995 | Bening et al. |
| 5,393,843 | 2/1995 | Handlin, Jr. et al. |
| 5,416,168 | 5/1995 | Willis et al. |
| 5,478,899 | 12/1995 | Bening. |
| 5,486,568 | 1/1996 | Bening et al. |

FOREIGN PATENT DOCUMENTS

| | | |
|---|---|---|
| 0 593 049 | 4/1994 | European Pat. Off. |
| 0 632 075 | 1/1995 | European Pat. Off. |
| 2 241 239 | 8/1991 | United Kingdom. |
| 2 270 317 | 3/1994 | United Kingdom. |
| WO 91/12277 | 8/1991 | WIPO. |

OTHER PUBLICATIONS

D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31, 1988).
A.J. Dias et al., Macromolecules 20, 2068–2076 (1987).

*Primary Examiner*—Irina S. Zemel
*Attorney, Agent, or Firm*—Bell Seltzer Intellectual Property; Law Group of Alston & Bird LLP

[57] ABSTRACT

The present invention provides novel, multi-arm or star-shaped polymers having mixed protected functional and non-functional ends, their optionally hydrogenated analogues, and the polymers produced by removal of the protecting groups. The invention also provides a process for the preparation of novel multi-arm or star-shaped polymers having branched-end functionality on some, but not all, of the branches. The multi-arm or star polymers of this invention are produced from more than one type of initiator, i.e., from both functional and non-functional initiators which, by design, incorporates both desired physical properties associated with multi-arm or star polymers with non-functional branch-ends and the versatility of functional branch end multi-arm or star polymers.

79 Claims, No Drawings

STAR POLYMERS FROM MIXED INITIATORS

CROSS-REFERENCE TO RELATED APPLICATIONS

This application is related to commonly owned copending Provisional application Ser. No. 60/001,687, filed Jul. 31, 1995, and claims the benefit of its earlier filing date under 35 U.S.C. §119(e).

This invention concerns novel, multi-branched or star-shaped polymers having mixed protected functional and non-functional ends, their optionally hydrogenated analogues, the polymers produced by removal of the protecting groups, and the processes to prepare these polymers.

BACKGROUND OF THE INVENTION

Multi-branched or star-shaped polymers were described by Zelinski in U.S. Pat. No. 3,280,084, in which polybutadiene anion (generated by addition of butyllithium to butadiene) was coupled with 0.02 to 1 part by weight of divinylbenzene to 100 parts of monomer. The resultant star polymer had a polydivinylbenzene core and several identical arms of polybutadiene radiating from the core. The arms could also be either random or block copolymers of styrene and butadiene, wherein the diene is the major component. The synthesis of star polymers with arms of different molecular weights was disclosed by Kitchen et al, U.S. Pat. No. 3,639,517. Fetters and Bi, U.S. Pat. No. 3,985,830, detailed the preparation of star polymers with a nucleus of more than one molecule of divinylbenzene, and more than three arms. These polymers were formed by addition of living homopolymers and copolymers of conjugated diene monomers and block copolymers of conjugated diene monomers and monovinylaromatic monomers to divinylbenzene. These unfunctionalized star polymers have been employed as viscosity index (V.I.) improvers for lube oil compositions (see for example, U.S. Pat. Nos. 5,310,490 and 5,310,814).

Star polymers have also been prepared which contain functionality, such as hydroxy groups, at the ends of the arms. For instance, European Patent Application 0632075, disclosed the preparation of star molecules with hydroxyl groups generated at the terminus of each living arm of the star. However, these functionalization reactions are often inefficient, due to the formation of physical gelation phenomena that produce severe mixing problems (see L. Weber, Makromol. Chem., Macromol. Symp., 3, 317 (1986) and U.S. Pat. Nos. 5,393,843 and 5,478,899). These polymers were prepared by addition of ethylene oxide to the living anions at the ends of the arms of the star polymer. These functionalized star polymers were useful in making adhesives, sealants, coatings, films and fibers.

SUMMARY OF THE INVENTION

The current invention concerns novel, multi-branched or star-shaped polymers having both protected functional and non-functional ends, their optionally hydrogenated analogues, the polymers produced by removal of the protecting groups, and the processes to prepare these polymers.

DESCRIPTION OF THE INVENTION

The present invention concerns novel, multi-branched or star-shaped polymers having mixed protected functional and non-functional ends, their optionally hydrogenated analogues, and the polymers produced by removal of the protecting groups. The invention also describes a process for the preparation of novel multi-branched ("star"-shaped) polymers having branched-end functionality on some, but not all, of the branches. The star polymers of this invention are unique in that they are produced from more than one type of initiator, i.e., from both functional and non-functional initiators which, by design, incorporates both desired physical properties associated with non-functional branch end star polymers and the versatility of functional branch end star polymers. For example, non-functional branches in the polymer provide improved impact resistance in the final polyester or polyamide molecules derived by copolymerization of hydroxy-, thio-, or amino- terminated functional branches in the polymer with comonomers such as dicarboxylic acids and diisocyanates.

Novel multi-arm or star-shaped polymers having both functional and non-functional ends are produced by polymerizing conjugated alkadienes, comprising the group of butadiene and isoprene, or alkenylsubstituted aromatic compounds, comprising the group of styrene and alpha-methylstyrene, either singly, sequentially, or as mixtures thereof, with mixtures of (a) alkyllithium initiators, comprising the group of n-butyllithium, sec-butyllithium, and tert-butyllithium and (b) protected functional organolithium initiators, having the formula:

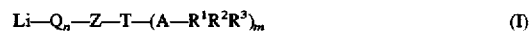

$$\text{Li}—Q_n—Z—T—(A—R^1R^2R^3)_m \quad \text{(I)}$$

where Q is an unsaturated hydrocarbyl group derived by incorporation of one or more conjugated diene hydrocarbons, one or more alkenylaromatic compounds, or mixtures of one or more dienes with one or more alkenylaromatic compounds into the Li—Z linkage at a carbon-lithium bond thereof ; Z is defined as a branched or straight chain hydrocarbyl connecting group containing 3 to 25 carbon atoms; T is an element selected from the group of oxygen, sulfur, and nitrogen; $(A—R^1R^2R^3)_m$ is a protecting group in which A is an element selected from Group IVa of the Periodic Table of the Elements as exemplified by carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur and 2 when T is nitrogen; and n is an integer from 0 to 5; to produce protected "living" polymer anions which are subsequently reacted with polyfunctional linking compounds, comprising the group of silicon tetrachloride, methyltrichlorosilane, tin tetrachloride (as described in U.S. Pat. No. 3,639,517 and by R. P. Zelinski et al in J.Polym.Sci., A3, 93, (1965)), phosphorus trichloride, isomeric diisopropenylbenzenes and isomeric divinylbenzenes, or mixtures thereof. Removal of the protecting group (deprotection) produces multi-arm or star polymers with hydroxyl, sulfhydryl, or amino groups on the ends of the polymer arms that had been terminated with protecting groups. The residual aliphatic unsaturation can be optionally removed by hydrogenation before or after removal of the protecting groups. These functional groups can then participate in various copolymerization reactions by reaction of the functional groups on the ends of the arms of the polymer with a selected difunctional or polyfunctional comonomer or comonomers selected from the group consisting of organic dicarboxylic acids, organic polycarboxylic acids, organic diisocyanates, organic polyisocyanates, organic diamides, organic polyamides, cyclic amides, organic diols, organic polyols, ethylene oxide in the presence of potassium butoxide, and methacryloyl chloride, acryloyl chloride, or styrenyldimethylchlorosilane, the last three of which are subsequently reacted with a free radically polymerizable monomer.

This linking process is described in U.S. Pat. No. 4,409,357 and by L. J. Fetters in Macromolecules, 9, 732, (1976). These radiating multi-arm or star polymers with protected functionality on the ends of some, but not all, of the arms may be optionally hydrogenated before or after removal of the protecting groups. The multi-arm or star polymers thus formed may have hydroxyl, sulfhydryl (thio), or amino functional branch ends as well as non-functional branch ends which serve to modify the physical properties of these star-shaped or multi-arm radiating polymers, especially after their further copolymerization with other functional monomers, such as organic diacids or organic diisocyanates.

The protected functional initiators of formula (I) comprise the group of omega-(tert-alkoxy)-1-alkyllithiums, omega-(tert-alkoxy)-1-alkyllithiums chain extended with conjugated alkadienes, as exemplified by isoprene, or alkenylsubstituted aromatics, as exemplified by styrene, omega-(tert-alkylthio)-1-alkyllithiums, omega-(tert-alkylthio)-1-alkyllithiums chain extended with conjugated alkadienes, as exemplified by isoprene, or alkenylsubstituted aromatics, as exemplified by styrene, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, as exemplified by isoprene, or alkenylsubstituted aromatics, as exemplified by styrene, and omega-(bis-tert-alkylsilylamino)alkyllithiums.

In another aspect of this invention, novel multi-branched or star-shaped polymers possessing both functional and non-functional ends may also be produced by separately polymerizing, either singly, sequentially, or as mixtures thereof, conjugated alkadienes, as exemplified by butadiene and isoprene, and alkenylsubstituted aromatic compounds, as exemplified by styrene and alpha-methylstyrene, with (a) alkyllithium initiators, comprising the group of n-butyllithium, sec-butyllithium, and tert-butyllithium, and with (b) protected functional organolithium initiators, having the formula:

$$\text{Li}-Q_n-Z-T-(A-R^1R^2R^3)_m \qquad (I)$$

where Q is an unsaturated hydrocarbyl group derived by incorporation of one or more conjugated diene hydrocarbons, one or more alkenylaromatic compounds, or mixtures of one or more dienes with one or more alkenylaromatic compounds into the Li—Z linkage at a carbon-lithium bond thereof; Z is defined as a branched or straight chain hydrocarbyl connecting group containing 3 to 25 carbon atoms; T is an element selected from the group of oxygen, sulfur, and nitrogen; $(A-R^1R^2R^3)_m$ is a protecting group in which A is an element selected from Group IVa of the Periodic Table of the Elements as exemplified by carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur and 2 when T is nitrogen; and n is an integer from 0 to 5; subsequently mixing the resulting separately produced "living" polymer anions, treating the resulting mixture with polyfunctional linking compounds, comprising the group of silicon tetrachloride, methyltrichlorosilane, tin tetrachloride, phosphorus trichloride, isomeric diisopropenylbenzenes and the isomeric divinylbenzenes (see references cited above), and optionally hydrogenating before or after optionally deprotecting the functional ends of the polymer. This alternative method allows for independent control of the molecular weight of the arms of the multi-arm or star polymer and provides for a more selective control of the physical properties of the resultant polymers. Removal of the protecting group (deprotection) produces multi-arm polymers with hydroxyl, sulfhydryl (thio), and amino or substituted amino functional groups on the ends of the polymer arms that had been terminated with protecting groups. The residual aliphatic unsaturation can be optionally removed by hydrogenation before or after removal of the protecting groups. These functional groups can then participate in various copolymerization reactions by reaction of the functional groups on the ends of the arms of the polymer with a selected difunctional or polyfunctional comonomer or comonomers selected from the group comprising organic dicarboxylic acids, organic polycarboxylic acids, organic diisocyanates, organic polyisocyanates, organic diamides, organic polyamides, cyclic amides, organic diols, organic polyols, ethylene oxide in the presence of potassium butoxide, and methacryloyl chloride, acryloyl or styrenyldimethylchlorosilane the last three of which can be subsequently reacted with a free radically polymerizable monomer.

The protected functional initiators of formula (I) comprise the group of omega-(tert-alkoxy)-1-alkyllithiums, omega-(tert-alkoxy)-1-alkyllithiums chain extended with conjugated alkadienes, as exemplified by isoprene, or alkenylsubstituted aromatics, as exemplified by styrene, omega-(tert-alkylthio)-1-alkyllithiums, omega-(tert-alkylthio)-1-alkyllithiums chain extended with conjugated alkadienes, as exemplified by isoprene, or alkenylsubstituted aromatics, as exemplified by styrene, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, as exemplified by isoprene, or alkenylsubstituted aromatics, as exemplified by styrene, and omega-(bis-tert-alkylsilylamino)alkyllithiums.

In contrast to star polymers of the prior art, the molecular architecture of compounds of the present invention can be more precisely controlled. The ratio of protected functionalized arms to non-functionalized arms can be adjusted by simply varying the ratio of protected functional initiator to alkyllithium initiator, or the ratio of the polymers prepared separately from these initiators. The mole percent of protected functional initiator in the total charge of initiator is between 2 and 98. Further, the monomer identity, the monomer composition and molecular weight of both the functional and non-functional arms can be independently manipulated by varying the monomer charged to each initiator. Finally, the manipulated by varying the monomer charged to each initiator. Finally, the number of polymer arms can be adjusted by varying the nature of the coupling agent, and by varying the ratio of living polymer to the coupling agent.

Idealized reaction equations shown below using equivalent amounts of functional and non-functional initiators, a single monomer, a common polymerization reactor, and the linking agent silicon tetrachloride serve to further clarify the process:

Equation 1

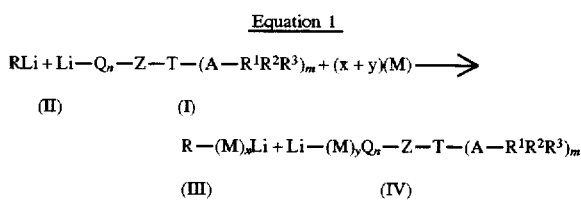

Equation 2

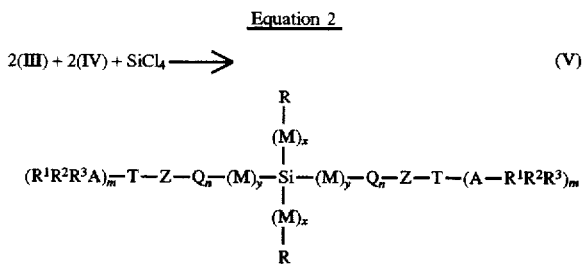

Equation 3

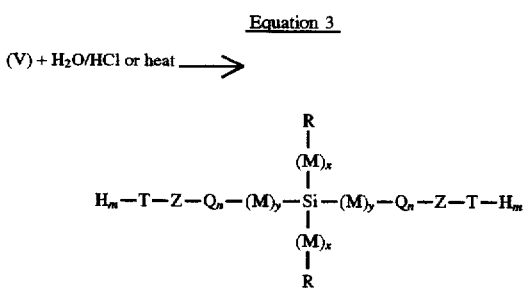

Formula (II) above represents a simple organolithium initiator where R is alkyl. Formula (I) above represents a protected functional organolithium initiator, where Q is an unsaturated hydrocarbyl group derived by incorporation of one or more conjugated diene hydrocarbons, one or more alkenylaromatic compounds, or mixtures of one or more dienes with one or more alkenylaromatic compounds into the M—Z linkage at a carbon-lithium bond ; Z is defined as a straight chain hydrocarbyl connecting group containing 3 to 25 carbon atoms; T is an element selected from the group of oxygen, sulfur, and nitrogen; $(A-R^1R^2R^3)_m$ is a protecting group in which A is an element selected from Group IVa of the Periodic Table of the Elements as exemplified by carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur and 2 when T is nitrogen; n is an integer from 0 to 5, and x and y are independently integers defining the number of monomer units M.

Examples of organolithium initiator (II) include, but are not limited to, ethyllithium, isopropyllithium, n-butyllithium, sec-butyllithium, tert-butyllithium, n-hexyllithium, n-octyllithium, and 2-ethylhexyllithium or mixtures thereof.

Examples of protected functionalized organolithium initiators (I) include, but are not limited to, tert-alkoxyalkyllithiums such as 3-(1,1-dimethylethoxy)-1-propyllithium and its more hydrocarbon-soluble isoprene chain-extended oligomeric analog (n=2 in formula (I) above), 3-(tert-butyldimethylsilyloxy)-1-propyllithium (n=0), tert-alkylthio-alkyllithiums such as 3-(1,1-dimethylethylthio)-1-propyllithium and its more hydrocarbon-soluble isoprene chain-extended oligomeric analog (n=2), 3-(dimethylamino)-1-propyllithium and its more hydrocarbon-soluble isoprene chain-extended oligomeric analog (n=2) and 3 -(di-tert-butyldimethylsilylamino)-1-propyllithium, and mixtures thereof. Further examples of protected functionalized intiators that may be employed in this invention include, but are not limited to: 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1 -propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their more hydrocarbon soluble conjugated alkadiene or alkenylsubstituted aromatic chain extended oligomeric analogs (n=1–5 in formula (I) above).

Protected functional organolithium initiators of the formula Li—Z—T—$(A-R^1R^2R3)_m$, (VII) which general formula represents the compound types Li—Z—O—$CR^1R^2R^3$, Li—Z—O—SiR$^1$R$^2$R$^3$, Li—Z—N—(CR$^1$R$^2$R$^3$)$_2$, Li—Z—N—(SiR$^1$R$^2$R$^3$)$_2$, Li—Z—S—CR$^1$R$^2$R$^3$ and Li—Z—S—SiR$^1$R$^2$R$^3$, are prepared by reacting their respective organic halides, Cl—Z—T—(A—R$^1$R$^2$R$^3$)$_m$, (general formula representing all six of the above shown formulas), with lithium metal in an inert, hydrocarbon solvent medium at reaction temperatures up to the reflux temperature of the solvent.

Incorporation of Q groups into the Li—Z linkage to form the compounds of formula (I) above involves addition of compounds of the formula Li—Z—T—(A—R$^1$R$^2$R$^3$)$_m$, (VII) where the symbols have the meanings ascribed above, across the carbon to carbon double bonds in compounds selected from the group of conjugated dienes and alkenyl-substituted aromatic hydrocarbons to produce new carbon-lithium bonds of an allylic or benzylic nature. These new carbon-lithium bonds are much like those found in a propagating polyalkadiene or polyarylethylene polymer chains derived by anionic initiation of the polymerization of conjugated dienes or arylethylenes. These new carbon-lithium bonds are now "activated" toward polymerization and so are much more efficient in promoting polymerization than the precursor Li—Z bonds, themselves.

Thus, the initiators of the formula Li—Q$_n$Z—T—(A—R$^1$R$^2$R$^3$)$_m$ (I) are prepared by reacting a compound of the formula Li—Z—T—(A—R$^1$R$^2$R$^3$)$_m$ (VII), wherein Z, T, A, R$^1$, R$^2$, R$^3$, and m have the meanings ascribed above, with one or more conjugated diene hydrocarbons, one or more alkenylaromatic compounds, or mixtures of one or more dienes with one or more alkenylsubstituted aromatic compounds, to form an extended hydrocarbon chain between Li and Z in formula which extended chain is denoted as Q$_n$ in formula (I) where n is an integer between 1 and 5. The compounds of formula (VII) are prepared by first, reacting in an inert solvent, a selected tertiary amino-1-haloalkane or an omega-hydroxy-protected-1-haloalkane or an omega-thio-protected-1-haloalkane, depending on whether "T" is to be N, O or S, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of formula VII) which is then optionally reacted with one or more conjugated diene hydrocarbons, one or more alkenylsubstituted aromatic compounds, or mixtures of one or more dienes with one or more alkenylaromatic compounds, in a predominantly alkane or cycloalkane reaction solvent, which solvent contains 5 to 10 carbon atoms, and mixtures of such solvents to produce a protected initiator with an extended chain —Q$_n$—Z— between the metal atom (Li) and element (T) in formula (I) above and mixtures thereof with compounds of formula VII.

While "A" in the protecting group (AR$^1$R$^2$R$^3$) of the formulae above can be any of the elements in Group IVa of the Periodic Table of the Elements, carbon and silicon initially appear to be the most useful, especially when polymerizing conjugated dienes.

The tertiary amino-1-haloalkanes useful in practicing this invention are compounds of the following general structures:

X—Z—N(A(R$^1$R$^2$R$^3$))$_2$ (VIII)

and

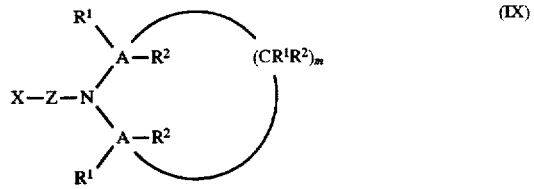

(IX)

wherein X is defined as a halogen, preferably chlorine or bromine; Z is defined as a branched or straight chain hydrocarbon connecting group which contains 3–25 carbon atoms; A is an element selected from Group IVa of the Periodic Table of the Elements, R$^1$, R$^2$, and R$^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and m is an integer from 1 to 7. The process reacts selected omega-tertiary-amino-1-haloalkanes whose alkyl groups contain 3 to 25 carbon atoms, with lithium metal at a temperature between about 35° C. and about 130° C., preferably at the reflux temperature of an alkane, cycloalkane, or aromatic reaction solvent containing 5 to 10 carbon atoms and mixtures of such solvents.

Anionic polymerizations employing the tertiary amine initiators are conducted in an inert solvent, preferably a non-polar solvent, optionally containing an ethereal modifier, using an olefinic monomer which is an alkenylaromatic or a 1,3-diene at a temperature of about –30° C. to about +150° C. The polymerization reaction proceeds from initiation to propagation to linking and is finally terminated with appropriate reagents. The multi-arm or star polymer arms before coupling with a polyfunctional linking agent, may have a molecular weight range of about 1000 to 40,000 but the molecular weight can be higher. Typically 5 to 50 milli-moles of initiator is used per mole of monomer.

Tertiary amino-1-haloalkanes useful in the practice of this invention include but are not limited to 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is selected from chlorine and bromine.

Omega-hydroxy-protected-1-haloalkanes, useful in producing the protected functional organolithium ether initiators useful in practicing this invention, have the following general structure:

$$X-Z-O-(C-R^1R^2R^3) \qquad (X)$$

wherein X is defined as a halogen, preferably chlorine or bromine; Z is a branched or straight chain hydrocarbon group which contains 3–25 carbon atoms, $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane, or aromatic reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation to linking and is finally terminated with appropriate reagents. The star polymer arms, before coupling with a polyfunctional linking agent, may have a molecular weight range of about 1000 to 40,000 but the molecular weight can be higher. Typically 5 to 50 millimoles of initiator is used per mole of monomer.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involved the reaction of the appropriate alcohol with 2-methyl-2-butene catalyzed by boron trifluoride etherate is employed for the preparation of the t-amyl ethers The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accord with this earlier process useful in practicing this invention can include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-dimethyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino)-1-ethoxy]-1-propyl halide, 3-[2(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is selected from chlorine and bromine.

U.S. Pat. No. 5,362,699 discloses a process for the preparation of hydrocarbon solutions of monofunctional ether initiators derived from omega-hydroxy-silyl-protected-1-haloalkanes of the following general structure:

$$X-Z-O-(Si-R^1R^2R^3) \qquad (XI)$$

wherein X is defined as a halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omegahydroxy-protected-1-haloalkanes whose alkyl groups contain 3 to 25 carbon atoms, with lithium metal at a temperature between about 25° C. and about 40° C., in an alkane, cycloalkane or aromatic reaction solvent containing 5 to 10 carbon atoms and mixtures of such solvents.

Anionic polymerizations employing the monofunctional silyl ether initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation to linking and is finally terminated with appropriate reagents. The star polymer arms, before coupling with a multifunctional linking agent, may have a molecular weight range of about 1000 to 40,000 but the molecular weight can be higher. Typically 5 to 50 milli-moles of initiator is used per mole of monomer.

Omega-silyloxy-1-haloalkanes prepared in accord with this earlier process useful in practicing this invention can include, but are not limited to, 3-(t-butyldimethylsilyloxy)-1-propyl halide, 3-(t-butyldimethyl-silyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethyl-silyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 6-(t-butyldimethylsilyloxy)-1-hexyl halide, and 3-(trimethylsilyloxy)-2,2-dimethyl-1-propyl halide. The halo- or halide group is selected from chlorine and bromine.

Monofunctional thioether initiators useful in the practice of this invention are derived from omega-thio-protected-1-haloalkanes of the following general structure:

$$X-Z-S-(A-R^1R^2R^3) \qquad (XII)$$

wherein X is defined as a halogen, preferably chlorine or bromine; Z is a branched or straight chain hydrocarbon group which contains 3–25 carbon atoms; (A—R¹R²R³) is a protecting group in which A is an element selected from Group IVa of the Periodic Table of the Elements; R¹, R², and R³ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional thio ether initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation to linking and is finally terminated with appropriate reagents. The polymer before coupling with a polyfunctional linking agent, may have a molecular weight range of about 1000 to 40,000 but the molecular weight can be higher. Typically 5 to 50 milli-moles of initiator is used per mole of monomer.

The initiator precursor, omega-thio-protected-1-haloalkanes (halides), are prepared from the corresponding halothiol by the standard literature methods. For example, 3-(1,1-dimethylethylthio)-1-propylchloride is synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Caves Tetrahedron Letters, 34, 1993, 5893, which involved the reaction of the appropriate thiol with 2-methyl-2-butene catalyzed by boron trifluoride etherate is employed for the preparation of the t-amyl ethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chlorides as taught by D. F. Taber and Y. Wang, J. Org. Chem., 58, 1993, 6470. Methoxymethylthio compounds, such as 6-(methoxymethylthio)-1-hexylchloride, are prepared by the reaction of the omega-chloro-thiol with bromochloromethane, methanol, and potassium hydroxide, by the method of F. D. Toste and 1. W. J. Still, Synlett, 1995, 159. t-Butyidimethylsilyl protected compounds, for example 4-(t-butyldimethylsilylthio)-1-butylhalide, are prepared from t-butyldimethylchlorosilane, and the corresponding thiol, according to the method described in U.S. Pat. No. 5,493,044.

Omega-thio-protected 1-haloalkanes prepared in accord with this earlier process useful in practicing this invention can include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexyl halide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t- butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butyihalide, 6-(t-butyldimethylsilylthio)-1-hexylhalide and 3-(trimethylsilylthio)-2,2-dimethyl-1-propylhalide. The halo- or halide group is selected from chlorine and bromine.

M is a monomer selected from the group of conjugated alkadienes, such as butadiene and isoprene, and alkenylaromatic compounds such as styrene and alpha-methylstyrene. The dienes may be polymerised alone, or in admixture with each other or with alkenylsubstituted aromatic compounds to form random copolymers, or by charging the dienes to the reaction mixture sequentially, either with each other or with alkenylsubstituted aromatic compounds, to form block copolymers. Examples of conjugated diene hydrocarbons include, but are not limited to: 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and myrcene.

Examples of polymerizable alkenylsubstituted aromatic compounds which can be anionically polymerized include, but are not limited to: styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methylhexene-1 and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include; 3-methylstyrene, 3,5-diethylstyrene, 2-ethyl-4-benzylstyrene, 4-phenylstyrene, 4-p-tolylstyrene, 4-(tert-butyl)-styrene, 2,4-divinyltoluene and 4,5-dimethyl-1-vinylnaphthalene. Reference is made to U.S. Pat. No. 3,377,404 for disclosures of additional alkenylsubstituted aromatic compounds.

Examples of linking or coupling agents recommended to link the polymer anions produced in the polymerizations initiated by the protected functional initiators are tri- and tetrahalosilanes, polyhalodisilanes, and tri- haloalkylsilanes, polyhaloalkyldisilanes, tri-, and tetrahalostannanes, and tri-haloalkylstannanes, 1,2, 1,3, and 1,4-divinylbenzene, 1,2, 1,3, and 1,4-diisopropenylbenzene, 1,2,4-trivinylbenzene, 1,3-divinylnaphthalene, 1,8-divinylnaphthalene, 1,3,5-trivinylnapthalene, 1,3,5-tris(1-phenylethenyl)benzene and other materials known in the art to be useful for linking or coupling of polymers. See for example, U.S. Pat. No. 5,489,649 for additional linking agents. Of course, mixtures of the linking agents may also be employed. The amount of linking agent added is such that the molar ratio of protected living polymer anions to linking agent is in the range of 1 to 24.

The reaction medium is generally an inert solvent, typically a non-polar solvent such as a hydrocarbon, since anionic polymerization in the presence of such non-polar solvents is known to produce polydienes with high 1,4-contents from 1,3-dienes. Inert hydrocarbon solvents useful in practicing this invention include but are not limited to inert liquid alkanes, cycloalkanes and aromatic solvents such as alkanes and cycloalkanes containing five to ten carbon atoms such as pentane, hexane, cyclohexane, methylcyclohexane, heptane, methylcycloheptane, octane, decane and so forth and aromatic solvents containing six to ten carbon atoms such as toluene, ethylbenzene, p-xylene, m-xylene, o-xylene, n-propylbenzene, isopropylbenzene, n-butylbenzene, t-butylbenzene, and the like.

Polar solvents (modifiers) can be added to the polymerization reaction to alter the microstructure of the resulting polymer, i.e., increase the proportion of 1,2 (vinyl) microstructure or to promote functionalization or randomization, in the case of copolymerization. Examples of polar modifiers include, but are not limited to: diethyl ether, dibutyl ether, tetrahydrofuran, 2-methyltetrahydrofuran, methyl tert-butyl ether, alkali metal alkoxides, diazabicyclo[2.2.2]octane, triethylamine, tributylamine, tetramethylethylene diamine (TMEDA), and 1,2-dimethoxyethane (glyme). The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

After reaction of the protected living polymer anion with the polyfunctional coupling agents, the reaction may be terminated by the addition of a proton donor, such as water, methanol, isopropanol, octanol, or acetic acid. The resultant multi-arm polymer may then be isolated by conventional means. For example, the reaction mixture may be poured into a precipitant, such as isopropanol to precipitate the polymer, followed by filtration and drying of the polymer. Alternatively, after termination, the solvent may be removed, to afford the protected multi-arm polymer.

If desired, the protecting groups can be removed from the arms of the multi-arm or star polymer to produce other novel polymers which can be reacted with a number of other comonomers to produce yet another group of novel block polymers. These multi-arm or star polymers with terminal functional groups at the ends of the arms can be classified as "multichelic" or telechelic multi-arm polymers, analagous to alpha, omega difunctionally terminated linear polymers, which are typically called "telechelic" polymers. Typically employed comonomer formulas which can be polymerized with the selectively deprotected multichelically functional multi-arm or star polymers of this invention are bisphenol A and phosgene, caprolactam and adipic acid, hexamethylene diamine and adipic acid, dimethyl terephthalate and 1,4-butanediol, and diphenyl methane diisocyanate and 1,4-butanediol, which produce, respectively, blocks of polycarbonate, polyamide, polyester, and polyurethane attached to the selectively deprotected telechelically functional polydiene, polyarylethylene, or polydiene/polyarylethylene arms of the star polymer. Where acid catalysis of such copolymerizations is employed, for example when the comonomer is a mixture of caprolactam and adipic acid and the catalyst is 85% phosphoric acid (aq) one may expect simultaneous deprotection of t-butyldimethylsilyl protecting groups to occur. Block arm lengths, as well as the nature of the blocks themselves, can be varied during copolymerization to allow for the preparation of a wide spectrum of multichelic segmented block star or multi-arm copolymers. These products find utility in coatings, binders, sealants, and molding resins. Reference is made to U.S. Pat. Nos. 4,994,526 and 5,393,843 for further details of the copolymerizations.

The deprotection step can be performed either prior to or after the optional hydrogenation of the residual unsaturation of the arms. For example, to remove tert-alkyl-protecting groups, the protected polymer is mixed with Amberlyst® 15 ion exchange resin and heated at an elevated temperature, for example 150° C., or at the reflux temperature of the solvent (cyclohexane) until deprotection is complete. In addition, tert-alkyl-protecting groups can also be removed by reaction of the star polymer with trifluoroacetic acid, p-toluenesulfonic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41. The tert-butyldimethylsilyl protecting groups can be removed by treatment of the multi-arm or star polymer with acid, such as hydrochloric acid, acetic acid, para-toluenesulfonic acid, or Dowex® 50W-X8 Alternatively, a source of fluoride ions, for instance tetra-n-butylammonium fluoride, potassium fluoride and 18-crown-6, or pyridine-hydrofluoric acid complex, can be employed for removal of the tert-butyldimethylsilyl protecting groups. Additional methods of removal of the tert-butyldimethylsilyl protecting groups can be found in T. W. Greene and P. G. M. Wuts, Protective Groups in Organic Synthesis, Second Edition, Wiley, New York, 1991, pages 80–83.

Examples of methods to hydrogenate the polymers of this invention are described in U.S. Pat. Nos. 4,970,254, 5,166, 277, 5,393,843 and 5,496,898. The hydrogenation of the multi-arm or star polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated star or multi-arm polymer is then recovered by conventional procedures, such as removal of the catalyst with aqueous acid wash, followed by solvent removal or precipitation of the polymer.

The protected hydroxy multi-arm star polymers of this invention alone and in their hydrogenated forms, could be used as base materials to lend flexibility and higher impact strength in a number of formulas to produce coatings, sealants, binders and block copolymers with polyesters, polyamides and polycarbonates as described in UK Patent Application GB2)7031 7A and in "Polytail" data sheets and brochures (Mitsubishi Kasei America).

Thus, in the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction. The multi-arm or star, segmented block copolymer which results, will be a segmented-linear, star-branched, or network polymer depending on the degree of functionality of the stars.

A segmented polyester-hydrogenated multi-arm block copolymer can be so produced by reaction of hydrogenated multi-arm polymer with dimethyl terephthalate and a suitable acidic catalyst. Again, the products are useful as molding compounds for exterior automotive components.

A segmented polyamide-hydrogenated block copolymer is useful as a molding composition to prepare exterior automotive components that can be prepared by reacting hydrogenated multi-arm polymer with caprolactam and adipic acid in the presence of a suitable catalyst.

Isocyanate-terminated prepolymers can be produced from hydrogenated multi-arm hydroxyfunctional polymers by reaction with suitable diisocyanates (2/1 NCO/OH) as above and which can be further reacted with diols and additional diisocyanates to form segmented polyurethanes useful for water based, low VOC coatings. Inclusion of acid functional diols such as dimethylolpropionic acid in the polyurethane introduces pendant carboxyl groups which can be neutralized with tertiary amines to afford water dispersable polyolefin/polyurethane segmented stars for water based coatings. This same principle could be applied to acrylic polymers made with tertiary amine functional monomers included, which could be made by free radical polymerization following reacting the hydroxyl groups at the terminal ends of the star with acryloyl chloride or methacryloyl chloride. Or segmented polyurethane prepolymers may be mixed with tackifying resins and used as a moisture-curable sealant, caulk or coating.

Alternatively, the protecting groups may be removed, either before or after hydrogenation of the aliphatic unsaturation, then the hydroxy terminated multi-arm polymer may be reacted with functional comonomers, to produce novel copolymers. Thus, for example, the hydroxy terminated polymer may be hydrogenated, and then reacted with ethylene oxide in the presence of potassium tert-butoxide to produce a poly(ethyleneoxide)-hydrogenated star block copolymer. This reaction sequence affords a hydrogel.

Further, after deprotection has been achieved using acid catalysis, hydrogenated multi-arm hydroxyterminated polymers may be reacted with bisphenol A and phosgene in the presence of appropriate basic catalysts to yield a polycarbonate block copolymer. The resulting products are useful as molding resins, for example, to prepare interior components for automobiles.

Another application for the hydroxyfunctional multi-arm or star polymer in coatings is in the preparation of new dendrimers, based on the use of the polymer in its hydrogenated or unhydrogenated form as the base core for dendritic hybrid macromolecules derived by condensation or addition polymerizations utilizing the hydroxyl functionality as the initiating site (see, for example Gitsov and Frechet, American Chemical Society PMSE Preprints, Volume 73, August 1995.

The polar functional groups on the polymer chain ends allow the polymers of this invention to alter the surface properties of polymers like polyethylene and polypropylene. When the polymers of this invention are blended with non-polar polyolefins, the polar functional groups on the chain ends, being incompatible with the non-polar polyolefin will phase separate and migrate to the surface of the polyolefin. Properties such as surface adhesion are thus greatly enhanced, leading to improved adhesion of pigments in printing inks for labels, composite layering, and other adhesive applications. An alternative approach to modification of polymer surfaces to alter properties by introduction of functional groups has been the use of chemical reagents such as alkyllithiums (see, for example, A. J. Dias, K-W Lee, and T. J. McCarthy, Rubber & Plastics News, 18–20, Oct. 31, 1988, and A. J. Dias and T. J. McCarthy, Macromolecules, 20, 1437 (1987)).

Yet another application for these telechelic functionalized multi-arm or star polymers would be for new toughening polymers for epoxy composites, utilizing the elastomer diene core with the hydroxyl groups converted to half esters by reaction with anhydrides, or converted to anhydrides by reaction with a halo-functional anhydride such as trimellitic anhydride chloride. These epoxy reactive stars can then be utilized as reactants with epoxy resins and amines in such composite systems. Reacting the hydroxyl functional stars into unsaturated polyesters provides a new polymer toughening system for polyester molding compounds for automotive and other uses. For a review of the use of linear polymers for toughening of epoxies and polyesters, see "Rubber-Toughened Plastics", Edited By C. Keith Riew, ACS Advances in Chemistry Series, #222.

Cathodic electrodepositable coatings may be prepared from the epoxy functional multi-arm or star polymers described above by reacting with epoxy resins in the presence of excess amine or polyamine, to completely react all the epoxy groups, distilling off the excess amine, and neutralizing the resulting epoxy-amine adduct with water soluble organic or inorganic acids to form water soluble, quarternary ammonium containing polymer salts (see for reference, U.S. Pat. Nos. 3,617,458, 3,619,398, 3,682,814, 3,891,527, 3,947,348, and 4,093,594). Alternatively,the above epoxy-amine polymer star adducts may be converted to quarternary phosphonium or sulfonium ion containing polymers as in U.S. Pat. No. 3,935,087.

In another application, the deprotected polymer may be reacted with chloromethylstyrene, or with an alkenylarylhalosilane such as styrenyldimethylchlorosilane to yield the corresponding omega-styrenyl-terminated macromonomer according to directions in U.S. Pat. No. 5,278,244 which may then be further polymerized by a variety of techniques to yield heterophase polymer network systems.

In still another application, the hydrogenated hydroxyterminated branches of the star polymer may be further reacted with acryloyl chloride or methacryloyl chloride, and the resultant acrylate or methacrylate-terminated polymer further polymerized with monomers selected from the group of alkyl acrylates, alkyl methacrylates, hydroxyallyl methacrylates, and dialkylacrylamides to produce hydrogels. Further, the acrylate or methacrylate-terminated multi-arm polymer may be polymerized by free-radical processes.

An acrylate-terminated prepolymer curable by free-radical processes can be prepared from the hydrogenated multi-arm hydroxyfunctional polymer by reaction with a diisocyanate (2NCO/OH) followed by further reaction with hydroxyethyl acrylate in the presence of a basic reagent.

V.I. Improvers is another likely application for this acrylate or methacrylate terminated polymer, where by using carboxyl functional monomers such as acrylic acid and methacrylic acid and/or amine functional monomers such as acrylamide along with free radical initiators in further polymerizations, the result is formation of polymer segments at the periphery of each star arm with amine or other functionalities which, in addition to the advantageous properties of the star polymers for V.I. Improvers, combines the ability to add functionality to the arms for dispersant properties (see for example, U.S. Pat. Nos. 5,496,898, 4,575,530, 4,486,573, 5,290,874, and 5,290,868).

The versatility of the hydroxyl functional multi-arm or star polymers of this invention, and the wide range of different segmented polymers (polyethers, polyesters, polyamides, polycarbonates, polyurethanes, etc.) which can be initiated at the hydroxyl groups, leads to numerous possible applications as compatibilizers for polymer blends and alloys. In addition to the use of such blends for new applications, much recent interest is generated in the use of compatibilizers to facilitate polymer waste recycling.

In contrast to star polymers of the prior art, the molecular architecture of compounds of the present invention can be precisely controlled. Those arms of the multi-arm polymer, which are generated from a protected functional initiator, contain a protected functional group. The nature of the functional group, and its protecting group can be varied, simply by changing the initiator. Further, the monomer identity, the monomer composition and molecular weight of the functional arms can be independently manipulated by varying the monomer charged to the initiator, as well as the ratio of functional to non-functional initiator. Finally, the number of polymer arms can be adjusted by varying the nature of the coupling agent, and the ratio of living polymer to the coupling agent.

The following are examples of the preparation of the polymers of this invention.

PREPARATION OF THE INITIATORS

EXAMPLE A

Preparation of 3-(t-Butyldimethylsilyloxy)-1-propyllithium Chain Extended with 2 Moles of Isoprene Lot 8983 (461–68)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloropropane, 58.82 grams (0.268 mole, 1.00 equivalent) was added dropwise. An exotherm was detected after 31.8% of the feed had been added. A dry ice/hexane cooling bath was applied to maintain the reaction temperature at 60°–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60°–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solutions yield=530 ml, 425.34 grams.

Total base=17.1 wt. %.

Active C—Li=15.9 wt %.

Yield (based on active C—Li)=80.8%.

EXAMPLE B

Preparation of 3-(t-Butyldimethylsilylthio)-1-propyllithium Chain Extended with 2 Moles of Isoprene Lot 12083 (761–68)

HYPOTHETICAL

A 500 ml, three-necked Morton flask is equipped with a mechanical stirrer, a 125 ml. pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 65° C. with a heating mantle. The heat source is removed. 1-(t-Butyldimethylsilylthio)-3-chloro-propane, 60.22 grams (0.268 mole, 1.00 equivalent) is added dropwise. An exotherm is detected after 21.8% of the feed has been added. A dry ice/hexane cooling bath is applied to maintain the reaction temperature at 60°–65° C. The total feed time is one hundred minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Isoprene, 36.45 grams (0.535 mole, 2.00 equivalents) is then added dropwise. An exotherm is noted after 24.6% of the feed has been added. Hexane cooling is applied to maintain the reaction temperature at 60°–65° C. The total isoprene feed time is thirty eight minutes. The reaction mixture is allowed to stir at room temperature for one hour, then transferred to a small pressure filter with argon pressure. Very rapid filtration is achieved with 2 psi argon. The muds are reslurried with cyclohexane (2×50 ml). This affords an orange solution; yield=530 ml, 435.21 grams.

Total base=17.7 wt. %.

Active C—Li=16.9 wt %.

Yield (based on active C—Li)=82.4%.

EXAMPLE C

Preparation of 3-(N,N-Dimethylamino)-1-propyllithium Chain Extended with 2 Moles of Isoprene, Lot 9314

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 10.57 grams (1.520 moles) was transferred to the flask with 250 ml cyclohexane. Coarse sand, 45.3 grams, was added to the reaction mixture. This suspension was stirred at 600–675 RPMs, and heated to 37° C. with a heating mantle. The heat source was removed. 1-Chloro-3-(N,N-dimethylamino)propane, 19.64 grams (0.1615 mole) dissolved in 120 ml. cyclohexane was added dropwise. An exotherm (up to 52° C.) was detected after 7% of the feed had been added. A dry ice/hexane cooling bath was applied to maintain the reaction temperature at 41°–44° C. The total feed time was thirty-two minutes. An exotherm was noted until the last drop of feed was added, then the temperature was maintained at 36°–40° C. for an additional thirty minutes. The reaction mixture was then transferred to a sintered glass filter while still warm. The filtration was complete in three minutes with three psi argon pressure. This afforded a hazy suspension.

Yield=400 ml., 298.2 grams.

Active C—Li=0.361M (0.469 m/kg)@ 40° C.

Yield (based on active C—Li=87%.

The product crystallized from solution upon standing at room temperature. The concentration of the clear supernatant solution was about 0.3M.

A dry 500 ml round bottom flask was fitted with a magnetic stir bar, and an argon inlet. This apparatus was purged with argon, then 154.77 grams (0.0726 mole) of the suspension prepared above was added to the flask. Isoprene, 9.4 grams (0.138 mole, 1.90 equivalents) was then added all at once. The reaction mixture was then heated to 48°–49° C. for forty minutes. This afforded a slightly hazy golden solution, which was partially vacuum-stripped on the rotary evaporator to afford the product solution.

Yield=43.32 grams.

Active C—Li=1.36M (1.65 m/kg).

Recovered yield (based on active C—Li)=98.5%.

EXAMPLES OF THE INVENTION— PREPARATION OF POLYMERS

Example 1

Preparation of Protected Functional Star Polymer

A star polymer with functionalized and non-functionalized arms was produced by purging an all-glass, high vacuum reactor with dry argon and charging it with 0.273 mmol of 3-t-butoxy-1-propyllithium (0.91 ml, 0.3M in toluene, chain-extended with 2 units of isoprene) and 0.273 mmol of sec-butyllithium (0.21 ml, 1.3M in cyclohexane) under a positive argon pressure. Purified, dry cyclohexane (200 ml) was distilled directly into the reactor followed by removal from the vacuum line by heat sealing with a hand torch. Next, the reactor was heated to 50° C. and then 10.6 g (15.6 ml) of isoprene was added via an attached ampoule with stirring. After heating for 5 hours at 50°–55° C., a 2 ml aliquot of poly(isoprenyl)lithium was removed via a sample port, the sample port was sealed off with a hand torch, and the sample was quenched with methanol. Analysis of the base polymer by SEC afforded $M_n$=29,000 g/mol. After raising the temperature to 60° C., 0.26ml of divinylbenzene (55% purity, 0.001 mol) was added to provide a [DVB]/[poly(isoprenyl)lithium]=3. After stirring at 60° C. for 9 hours, the reaction was terminated by addition of 1.5 ml of degassed methanol. The resulting polymer was precipitated into methanol two times and dried in a vacuum oven. The polymer was analyzed by SEC and by $^1$H NMR spectroscopy. The polymer molecular weight by SEC analysis (polyisoprene standards) corresponded to $M_n$=450,000 (universal calibration method) and $M_w/M_n$=1.33. The amount of unlinked polyisoprene corresponded to approximately 16 wt. %. The $^1$H NMR spectrum of the final polymer exhibited peaks at δ=1.165 and 0.844 ppm corresponding to the tert-butoxy and sec-butyl end groups, respectively. The resulting polymer is optionally hydrogenated.

Example 2 (Hypothetical)

Deprotection of Functional Star Polymer Produced in Example 1

A 1.00 gram sample of the polymer prepared in Example 1 is dissolved in 10 ml of toluene containing 0.5 g of Amberlyst® 15 Resin. The mixture is heated at reflux for 13 hours. The reaction mixture is cooled to room temperature, the resin is removed by filtration, the solvent is removed, and the polymer is vacuum dried. The $^1$H NMR spectrum of the polymer exhibits no peaks corresponding to the tert-butoxy end group at δ=1.17 ppm.

Example 3 (Hypothetical)

Hydrogenation of t-butoxy functionalized polyisoprene star

The hydrogenation catalyst is preformed by mixing 1.00 gram (8% in pentane) nickel octoate and 0.76 grams of triethylaluminum (25% in cyclohexane) in a small, dry vial. The final ratio of aluminum to nickel is 1.22. The dry hydrogenation vessel is purged with argon, then charged with the t-butoxy substituted multi-arm polymer prepared in Example 1, purified cyclohexane, and finally, the catalyst (prepared above). The atmosphere is exchanged with hydrogen gas by pressuring the vessel up to 20 psi, and then releasing the pressure. This is repeated 5 times. The pressure is then increased to 90 psi, and the magnetically stirred solution is then heated to 70° C. The hydrogenation is conducted for twelve hours. The reaction mixture is then allowed to cool to room temperature, and the hydrogen pressure is released. The catalyst is removed by washing the polymer with dilute acid (0.5% hydrochloric acid) three times. The polymer is recovered and dried.

The resultant saturated functionalized star polymer was fully characterized by $^1$H NMR, IR and SEC,and had the following properties:

Mn=430,000 g/mole (based on universal calibration method).

$^1$H NMR indicates that all the aliphatic unsaturation (4.50–5.20 ppm) is consumed, and that the t-butoxy group is still present (1.15 ppm).

IR indicates all the aliphatic double bond absorptions at 800–900 and 1650–1670 wavenumbers are gone.

Example 4 (Hypothetical)

Deprotection of Hydrogentated Functional Star Polymer Produced in Example 3

A 1.00 gram sample of the polymer prepared in Example 3 is dissolved in 10 ml of toluene containing 0.5 g of Amberlyst® 15 Resin. The mixture is heated at reflux for 13 hours. The reaction mixture is cooled to room temperature, the resin is removed by filtration, the solvent is removed, and the polymer is vacuum dried. The $^1$H NMR spectrum of the polymer exhibits no peaks corresponding to the tert-butoxy end group at $\delta$=1.17 ppm.

Example 5 (Hypothetical)

Preparation of Protected Functionalized Star Molecule

A star polymer with functionalized and non-functionalized arms is produced by purging an all-glass, high vacuum reactor with dry argon and charging it with 0.511 mmol of 3-(t-butyldimethylsilyloxy)-1-propyllithium (0.73 ml, 0.7M in cyclohexane) and 0.511 mmol of n-butyllithium (0.25 ml, 2.0M in cyclohexane) under a positive argon pressure. Purified, dry cyclohexane (400 ml) is distilled directly into the reactor followed by removal from the vacuum line by heat sealing with a hand torch. Next, the reactor is heated to 50° C. and then 40.4 g (60 ml) of isoprene is added via an attached ampoule with stirring. After heating for 5 hours at 50°–55° C., a 2 ml aliquot of poly(isoprenyl)lithium is removed via a sample port, and the sample is quenched with methanol. The sample port is sealed off with a hand torch. Analysis of the base polymer by SEC affords ($M_n$=43,000 g/mol, PDI=1.10). After raising the temperature to 60° C., 0.74 ml of divinylbenzene (55% purity, 0.001 mol) is added to provide a [DVB]/[poly(isoprenyl)lithium]=3. After stirring at 60° C. for 9 hours, the reaction is terminated by addition of 1.5 ml of degassed methanol. The resulting polymer is precipitated into methanol two times and dried in a vacuum oven. The polymer is analyzed by SEC and by $^1$H NMR spectroscopy. The polymer molecular weight by SEC analysis (polyisoprene standards) corresponds to $M_n$=250,000, by SEC, linear polyisoprene standard, and 470,000 by universal calibration method and $M_w/M_n$=1.40. The amount of unlinked polyisoprene corresponds to approximately 12 wt. %. The $^1$H NMR spectrum of the final polymer exhibits peaks at $\delta$=0.88 and 0.844 ppm corresponding to the (tert-butyldimethylsilyloxy) and sec-butyl end groups, respectively. The resulting polymer is optionally hydrogenated.

Example 6 (Hypothetical)

Deprotection of Functionalized Star Polymer of Example 5

A 1.00 gram sample of the polymer prepared in Example 5 is dissolved in 10 ml of tetrahydrofuran containing 3 drops of 1.37N aqueous HCl. The mixture is heated at reflux for 4 hours. The reaction mixture is allowed to cool to room temperature, the solvent is removed, and the polymer is vacuum dried. The $^1$H NMR spectrum of the polymer exhibits no peaks corresponding to the (tert-butyldimethylsilyloxy) end group at $\delta$=0.89ppm.

Example 7 (Hypothetical)

Preparation of Functionalized Star Polymer

A star polymer with functionalized and non-functionalized arms is produced by purging an all-glass, high vacuum reactor with dry argon and charging it with 0.273 mmol of hexamethyleneimino-1-propyllithium (0.91 ml, 0.3M in cyclohexane, chain-extended with 2 units of isoprene) and 0.273 mmol of sec-butyllithium (0.21 ml, 1.3M in cyclohexane) under a positive argon pressure. Purified, dry cyclohexane (200 ml) is distilled directly into the reactor followed by removal from the vacuum line by heat sealing with a hand torch. Next, the reactor is heated to 50° C. and then 10.6 g (15.6 ml) of isoprene is added via an attached ampoule with stirring. After heating for 5 hours at 50°–55° C., a 2 ml aliquot of poly(isoprenyl)lithium is removed via a sample port, and the sample is quenched with methanol. The sample port is sealed off with a hand torch. Analysis of the base polymer by SEC affords ($M_n$=29,000 g/mol). After raising the temperature to 60° C., 0.26 ml of divinylbenzene (55% purity, 0.001 mol) is added to provide a [DVB]/[poly(isoprenyl)lithium]=3. After stirring at 60° C. for 9 hours, the reaction is terminated by addition of 1.5 ml of degassed methanol. The resulting polymer is precipitated into methanol two times and is dried in a vacuum oven. The polymer is analyzed by SEC and by $^1$H NMR spectroscopy. The polymer molecular weight by SEC analysis (polyisoprene standards) corresponds to $M_n$=235,000 and $M_w/M_n$=1.13. The amount of unlinked polyisoprene corresponds to approximately 16 wt. %. The $^1$H NMR spectrum of the final polymer exhibits peaks at $\delta$=2.20 and 0.844 ppm corresponding to the methylenes adjacent to nitrogen and sec-butyl groups, respectively.

The resultant elastomeric product provided excellent cross-linking properties when used as an additive to tire rubber/ carbon-black vulcanizates.

Example 8 (Hypothetical)

Preparation of a Block Copolymer from the Deprotected Polyisoprene Multiarm Polymer of Example 4

A weight of 30.00 grams of the deprotected polymer of Example 4 is dissolved in 300 ml of cyclohexane and treated with 1.05 g of methacryloyl chloride and 1.00 g of pyridine at 35°–45° C. with stirring for a period of 8 hr. The mixture is poured into an equal volume of water and stirred thoroughly. The organic layer is separated, washed several times with water, and dried. The methacrylate-terminated polymer solution is treated further with 10.00 grams of styrene in the presence of an organic peroxide at 35°–50° C. over a period of several hours to yield a solution of a segmented block multi-arm star possessing outer segments of styrene attached to inner segments of hydrogenated polyisoprene on each of the deprotected arms of the polymer.

Example 12. (Hypothetical)
Preparation of a Segmented Block Copolymer from the Deprotected Polyisoprene Multiarm Polymer of Example 4

A 500 ml flask is charged with 200 ml of water, 250 ml of methylene chloride, one ml of triethylamine, 1.0 gram of p-tert-butylphenol, 5.9 g (0.0007 moles) of the hydrogenated, deprotected polymer of Example 4, and 50.0 grams (0.22 moles) of bisphenol A. With stirring, phosgene is introduced into the flask at a rate of 1 gram/min. for 60 minutes while the pH is maintained at 10.5 to 11.5 by appropriate addition of 50% aq. NaOH. The layers are separated, the organic layer is washed with 3 wt % HCl until the washings remain acidic, and the organic layer is then washed with water. The resin is precipitated from solution into methanol and dried.

What is claimed is:

1. Multi-branched or star-shaped polymers having mixed functional and non-functional ends produced by a process comprising the steps of:

(a) polymerizing conjugated alkadienes, selected from butadiene, isoprene and alkenylsubstituted aromatic compounds selected from styrene alpha-methylstyrene, singly, sequentially, or as mixtures thereof, in a liquid reaction medium, at a temperature of −30° C. to 150° C., for a period of at least one hour, with mixtures of (a) alkyllithium initiators, selected from n-butyllithium, sec-butyllithium, and tert-butyllithium and (b) protected functional organolithium initiators, having the formula:

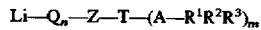

where Q is an unsaturated hydrocarbyl group derived by incorporation of one or more conjugated diene hydrocarbons, one or more alkenylaromatic compounds, or mixtures of one or more dienes with one or more alkenylaromatic compounds into the Li—Z linkage at a carbon-lithium bond thereof; Z is defined as a branched or straight chain hydrocarbyl connecting group containing 3 to 25 carbon atoms; T is an element selected from the group of oxygen, sulfur, and nitrogen; $(A—R^1R^2R^3)_m$ is a protecting group in which A is an element selected from Group IVa of the Periodic Table of the Elements, as exemplified by carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur and 2 when T is nitrogen; and n is an integer from 0 to 5, to produce protected "living" polymer anions;

(b) Reacting the living polymer anions with a polyfunctional linking compound selected from silicon tetrachloride, tin tetrachloride, phosphorus trichloride, isomeric diisopropenylbenzenes and isomeric divinylbenzenes, and mixtures of these compounds at a temperature of 20° C. to 135° C., for a period of at least one hour, to produce multi-arm star polymers, followed by termination with a protic terminating agent;

(c) Removing the protecting group to produce functionalized multichelic multi-arm or star polymers with hydroxyl, sulfhydryl, or amino groups on the end of some of the arms of the multi-arm or star polymers;

(d) Reaction of the functionalized groups on the ends of the arms of the multi-arm or star polymers with a selected difunctional or polyfunctional comonomer or comonomers selected from the group consisting of organic dicarboxylic acids, organic polycarboxylic acids, organic diisocyanates, organic polyisocyanates, organic diamides, organic polyamides, cyclic amides, organic diols, organic polyols, ethylene oxide in the presence of potassium butoxide, and methacryloyl chloride, acryloyl chloride, or styrenyldimethylchlorosilane, the last three of which are subsequently copolymerized with a free radically polymerizable monomer;

(e) Recovering the multi-arm star polymers from the reaction medium.

2. The multi-arm or star polymer of claim 1 wherein the protected functional initiator was selected from the group comprising omega-(tert-alkoxy)-1-alkyllithiums, omega-(tert-alkoxy)-1-alkyllithiums chain extended with conjugated alkadienes or alkenylsubstituted aromatic compounds, omega-(tert-alkylthio)-1-alkyllithiums, omega-(tert-alkylthio)-1-alkyllithiums chain extended with conjugated alkadienes or alkenylsubstituted aromatic compounds, omega-(tert-butoxydimethylsilyloxy)-1-alkyllithiums, omega-(tert-butoxydimethylsilylthio)-1-alkyllithiums, omega-(dialkylamino)-1-alkyllithiums, omega-(dialkylamino)-1-alkyllithiums chain-extended with conjugated alkadienes or alkenylsubstituted aromatic compounds, and omega-(bis-tert-alkylsilylamino)-1-alkyllithiums.

3. The multi-arm or star polymer of claim 1 wherein the protected functional initiator was selected from 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, and their more hydrocarbon soluble analogs derived by incorporation of one or more conjugated diene hydrocarbons, one or more alkenylaromatic compounds or mixtures of one or more dienes with one or more alkenylaromatic compounds at the lithium carbon bond.

4. The product of claim 1 further comprising multi-arm or star polymers hydrogenated at a temperature between 25° and 150° C. after forming the multi-arm or star polymer and prior to removing the protecting groups to produce a functionalized multichelic multi-arm or star polymer with protected functional groups on the ends of some of the arms of the polymer.

5. The product of claim 1 further comprising the multi-arm star polymers hydrogenated after deprotection of the polymer at a temperature between 25° and 150° C. to produce a saturated, functionalized multichelic multi-arm or star polymer with functional groups on the ends of some of the arms of the polymer.

6. The product of claim 4 wherein the hydrogenation was continued until at least 90% of the aliphatic unsaturation has been saturated.

7. The product of claim 5 wherein the hydrogenation was continued until at least 90% of the aliphatic unsaturation has been saturated.

8. The product of claim 4 wherein the hydrogenation was continued until at least 95% of the aliphatic unsaturation has been saturated.

9. The process of claim 5 wherein the hydrogenation was continued until at least 95% of the aliphatic unsaturation has been saturated.

10. The multi-arm or star polymer of claim 1 wherein the protecting group has been removed from the functional group.

11. The multi-arm or star polymer of claim 3 wherein the protecting group has been removed from the functional group.

12. The multi-arm or star polymer of claim 1 wherein the mole percentage of protected functional organolithium initiator in the total lithium initiator charge was between 2 and 98.

13. The product of claim 1 wherein the polyfunctional linking compounds were selected from chlorosilanes, chlorostannanes, isomeric divinylbenzenes, isomeric diisopropenylbenzenes, isomeric trivinylbenzenes, isomeric divinylnaphthalenes, isomeric trivinylnaphthalenes, and 1,3,5-tris(1-phenylethenyl)benzene.

14. The multi-arm or star polymer of claim 1 wherein the conjugated alkadiene polymerized is butadiene, the alkyllithium was sec-butyllithium, the omega protected functional organolithium initiator was selected from the group consisting of: 3-(1,1-dimethylethoxy)-1-propyllithium, chain extended with a conjugated alkadiene selected from butadiene, isoprene and alkenylsubstituted aromatics selected from styrene and alpha-methylstyrene; 3-(1,1-dimethylpropoxy)-1-propyllithium, chain extended with a conjugated alkadiene selected from butadiene, isoprene and alkenylsubstituted aromatics selected from styrene and alpha-methylstyrene; 3-(1,1-dimethylethylthio)-1-propyllithium, chain extended with a conjugated alkadiene selected from butadiene, isoprene, and alkenylsubstituted aromatics selected from styrene and alpha-methylstyrene; 3-(dimethylamino)-1-propyllithium, chain extended with a conjugated alkadiene selected from butadiene, isoprene, and alkenylsubstituted aromatics selected from styrene and alpha-methylstyrene; 3-(tert-butyldimethylsilylthio)-1-propyllithium and 3-(tert-butyldimethylsilyloxy)-1-propyllithium and the polyfunctional linking compound is selected from the group consisting of silicon tetrachloride, tin tetrachloride, isomeric diisopropenylbenzenes and isomeric divinylbenzenes.

15. The multi-arm or star polymer of claim 1 wherein the conjugated alkadiene polymerized is isoprene, the alkyllithium is sec-butyllithium, the protected functional organolithium initiator is selected from the group consisting of 3-(1,1-dimethylethoxy)-1-propyllithium, chain extended with isoprene; 3-(1,1-dimethylpropoxy)-1-propyllithium, chain extended with isoprene, 3-(1,1-dimethylethylthio)-1-propyllithium, chain extended with isoprene, 3-(dimethylamino)-1-propyllithium, chain extended with isoprene, 3-(tert-butyldimethylsilylthio)-1-propyllithium and 3-(tert-butyldimethylsilyloxy)-1-propyllithium and the polyfunctional linking compound is selected from the group consisting of silicon tetrachloride, tin tetrachloride, isomeric diisopropenyl benzenes, and isomeric divinylbenzenes.

16. The multi-arm or star polymer of claim 1 wherein the mixture of conjugated alkadiene and alkenylaromatic compound polymerized by the alkyllithium consists of butadiene and styrene, the alkyllithium initiator is sec-butyllithium, the protected functional initiator is selected from the group consisting of: 3-(1,1-dimethylethoxy)-1-propyllithium, chain extended with a conjugated alkadiene selected from butadiene, isoprene, and alkenylsubstituted aromatics selected from styrene and alpha-methylstyrene; 3-(1,1-dimethylpropoxy)-1-propyllithium, chain extended with a conjugated alkadiene selected from butadiene, isoprene, and alkenylsubstituted aromatics selected from styrene and alpha-methylstyrene; 3-(1,1-dimethylethylthio)-1-propyllithium, chain extended with a conjugated alkadiene selected from butadiene, isoprene, and alkenylsubstituted aromatics selected from styrene and alpha-methylstyrene; 3-(dimethylamino)-1-propyllithium, chain extended with a conjugated alkadiene selected from butadiene, isoprene, and alkenylsubstituted aromatics selected from styrene and alpha-methylstyrene; 3-(tert-butyldimethylsilylthio)-1-propyllithium and 3-(tert-butyldimethylsilyloxy)-1-propyllithium, and the polyfunctional linking compound is selected from the group consisting of silicon tetrachloride, tin tetrachloride, isomeric diisopropenyl benzenes and isomeric divinylbenzenes.

17. The multi-arm or star polymer of claim 1 wherein the conjugated alkadiene and alkenylaromatic compound polymerized sequentially were butadiene and styrene, the alkyllithium initiator is sec-butyllithium, the protected functional initiator is selected from the group consisting of: 3-(1,1-dimethylethoxy)-1-propyllithium, chain extended with a conjugated alkadiene selected from butadiene, isoprene and alkenylsubstituted aromatics selected from styrene and alpha-methylstyrene; 3-(1,1-dimethylpropoxy)-1-propyllithium, chain extended with a conjugated alkadiene selected from butadiene, isoprene, or alkenylsubstituted aromatics selected from styrene and alpha-methylstyrene, 3-(1,1-dimethylethylthio)-1-propyllithium, chain extended with a conjugated alkadiene selected from butadiene, isoprene, or alkenylsubstituted aromatics selected from styrene and alpha-methylstyrene, 3-(dimethylamino)-1-propyllithium, chain extended with a conjugated alkadiene selected from butadiene, isoprene, or alkenylsubstituted aromatics selected from styrene and alpha-methylstyrene, 3-(tert-butyldimethylsilylthio)-1-propyllithium, and 3-(tert-butyldimethylsilyloxy)-1-propyllithium, and the polyfunctional linking compound is selected from the group consisting of silicon tetrachloride, tin tetrachloride, isomeric diisopropenyl benzenes and isomeric divinylbenzenes.

18. The multi-arm or star polymer of claim 1 wherein the mixture of conjugated alkadiene and alkenylaromatic compound polymerized by the alkyllithium were isoprene and styrene, the alkyllithium initiator is sec-butyllithium, the protected functional initiator is selected from the group consisting of: 3-(1,1-dimethylethoxy)-1-propyllithium, chain extended with a conjugated alkadiene selected from butadiene, isoprene and alkenylsubstituted aromatics selected from styrene and alpha-methylstyrene; 3-(1,1-dimethylpropoxy)-1-propyllithium, chain extended with a conjugated alkadiene selected from butadiene, isoprene and alkenylsubstituted aromatics selected from styrene and alpha-methylstyrene; 3-(1,1-dimethylethylthio)-1-propyllithium, chain extended with a conjugated alkadiene selected from butadiene, isoprene, and alkenylsubstituted aromatics selected from styrene and alpha-methylstyrene; 3-(dimethylamino)-1-propyllithium, chain extended with a conjugated alkadiene selected from butadiene, isoprene and alkenylsubstituted aromatics selected from styrene and alpha-methylstyrene; 3-(tert-butyldimethylsilylthio)-1-propyllithium and 3-(tert-butyldimethylsilyloxy)-1-propyllithium, and the polyfunctional linking compound is selected from the group consisting of silicon tetrachloride, tin tetrachloride, isomeric diisopropenylbenzenes and isomeric divinylbenzenes.

19. The multi-arm or star polymer of claim 1 wherein the conjugated alkadiene and alkenylaromatic compound polymerized sequentially were isoprene and styrene, the alkyllithium initiator is sec-butyllithium, the protected functional initiator is selected from the group consisting of: 3-(1,1-dimethylethoxy)-1-propyllithium, chain extended with a conjugated alkadiene selected from butadiene, isoprene and alkenylsubstituted aromatics selected from styrene and alpha-methylstyrene; 3-(1,1-dimethylpropoxy)-1-propyllithium, chain extended with a conjugated alkadiene selected from butadiene, isoprene, and alkenylsubstituted aromatics selected from styrene and alpha-methylstyrene; 3-(1,1-dimethylethylthio)-1-propyllithium, chain extended with a conjugated alkadiene selected from butadiene, isoprene and alkenylsubstituted aromatics selected from styrene and alpha-methylstyrene; 3-(dimethylamino)-1-propyllithium, chain extended with a conjugated alkadiene selected from butadiene, isoprene and alkenylsubstituted aromatics selected from styrene and alpha-methylstyrene; 3-(tert-butyldimethylsilylthio)-1-propyllithium and 3-(tert-butyldimethylsilyloxy)-1-propyllithium, and the polyfunctional linking compound is selected from the group consisting of silicon tetrachloride, tin tetrachloride, isomeric diisopropenylbenzenes and isomeric divinylbenzenes.

20. The multi-arm or star polymer of claim 1 wherein the conjugated alkadiene polymerized was butadiene, the alkyllithium initiator was n-butyllithium, the protected functional initiator was selected from the group consisting of: 3-(1,1-dimethylethoxy)-1-propyllithium, chain extended with a conjugated alkadiene selected from butadiene, isoprene and alkenylsubstituted aromatics selected from styrene and alpha-methylstyrene; 3-(1,1-dimethylpropoxy)-1-propyllithium, chain extended with a conjugated alkadiene selected from butadiene, isoprene and alkenylsubstituted aromatics selected from styrene and alpha-methylstyrene; 3-(1,1-dimethylethylthio)-1-propyllithium, chain extended with a conjugated alkadiene selected from butadiene, isoprene, and alkenylsubstituted aromatics selected from styrene and alpha-methylstyrene; 3-(dimethylamino)-1-propyllithium, chain extended with a conjugated alkadiene selected from butadiene, isoprene and alkenylsubstituted aromatics selected from styrene and alpha-methylstyrene; 3-(tert-butyldimethylsilylthio)-1-propyllithium and 3-(tert-butyldimethylsilyloxy)-1-propyllithium, and the polyfunctional linking compound is selected from the group consisting of silicon tetrachloride, tin tetrachloride, isomeric diisopropenylbenzenes and isomeric divinylbenzenes.

21. Multi-branched or star-shaped polymers having mixed functional and non-functional ends produced by a process comprising the steps of:

(a) polymerizing conjugated alkadienes, comprising the group of butadiene and isoprene, or alkenylsubstituted aromatic compounds, comprising the group of styrene and alpha-methylstyrene singly, sequentially, or as mixtures thereof, in a liquid reaction medium, at a temperature of $-30°$ C. to $150°$ C., for a period of at least one hour, separately with (a) alkyllithium initiators, comprising the group of n-butyllithium, sec-butyllithium, and tert-butyllithium and (b) protected functional organolithium initiators, having the formula:

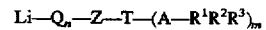

$$Li-Q_n-Z-T-(A-R^1R^2R^3)_m$$

where Q is an unsaturated hydrocarbyl group derived by incorporation of one or more conjugated diene hydrocarbons, one or more alkenylaromatic compounds, or mixtures of one or more dienes with one or more alkenylaromatic compounds into the Li—Z linkage at a carbon-lithium bond thereof; Z is defined as a branched or straight chain hydrocarbyl connecting group containing 3 to 25 carbon atoms; T is an element selected from the group of oxygen, sulfur, and nitrogen; $(A-R^1R^2R^3)_m$ is a protecting group in which A is an element selected from Group IVa of the Periodic Table of the Elements; $R^1, R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur and 2 when T is nitrogen; and n is an integer from 0 to 5, to separately produce protected "living" polymer anions;

(b) Mixing the separately produced "living" anions, then reacting the living polymer anions with a compound selected from the group of polyfunctional linking compounds, as exemplified by silicon tetrachloride, tin tetrachloride, phosphorus trichloride, isomeric diisopropenylbenzenes and isomeric divinylbenzenes, and mixtures of these compounds at a temperature of 20° C. to 135° C., for a period of at least one hour, to produce multi-arm star polymers;

(c) Removing the protecting group to produce functionalized multichelic multi-arm or star polymers with hydroxyl, sulfhydryl or amino groups on the ends of some of the arm of the multi-arm or star polymers;

(d) Reaction of the functional groups on the ends of the arms of the polymer with a selected difunctional or polyfunctional comonomer or comonomers selected from the group consisting of organic dicarboxylic acids, organic polycarboxylic acids, organic diisocyanates, organic polyisocyanates, organic diamides, organic polyamides, cyclic amides, organic diols, organic polyols, ethylene oxide in the presence of potassium butoxide, and methacryloyl chloride, acryloyl or styrenyldimethylchlorosilane the last three of which are subsequently copolymerized with a free radically polymerizable monomer;

(e) Recovering the multi-arm star polymers from the reaction medium.

22. The multi-arm or star polymer of claim 21 wherein the protected functional initiator was selected from the group comprising omega-(tert-alkoxy)-1-alkyllithiums, omega-(tert-alkoxy)-1-alkyllithiums chain extended with conjugated alkadienes or alkenylsubstituted aromatic compounds, omega-(tert-alkylthio)-1-alkyllithiums, omega-(tert-alkylthio)-1-alkyllithiums chain extended with conjugated alkadienes or alkenylsubstituted aromatic compounds, omega-(tert-butoxydimethylsilyloxy)-1-alkyllithiums, omega-(tert-butoxydimethylsilylthio)-1-alkyllithiums, omega-(dialkylamino)-1-alkyllithiums, omega-(dialkylamino)-1alkyllithiums chain-extended with conjugated alkadienes or alkenylsubstituted aromatic compounds, and omega-(bis-tert-alkylsilylamino)-1-alkyllithiums.

23. The multi-arm or star polymer of claim 21 wherein the protected functional initiator was selected from the group consisting of 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, and their more hydrocarbon soluble analogs derived by incorporation of one or more conjugated diene hydrocarbons, one or more alkenylaromatic compounds or mixtures of one or more diene hydrocarbons with one or more alkenylaromatic compounds at the lithium carbon bond.

24. The product of claim 21 further comprising multi-arm or star polymers hydrogenated at a temperature between 25° and 150° C. after forming the multi-arm or star polymer and prior to removing the protecting groups to produce a functionalized hydrogenated multichelic multi-arm or star polymer with protected functional groups on the ends of some of the arms of the polymer.

25. The product of claim 21 further comprising multi-arm or star polymers hydrogenated after deprotection of the polymer at a temperature between 25° and 150° C. to produce a saturated, functionalized multichelic multi-arm or star polymer with functional groups on the ends of some of the arms of the polymer.

26. The product of claim 24 wherein the hydrogenation was continued until at least 90% of the aliphatic unsaturation had been saturated.

27. The product of claim 25 wherein the hydrogenation was continued until at least 90% of the aliphatic unsaturation had been saturated.

28. The product of claim 24 wherein the hydrogenation was continued until at least 95% of the aliphatic unsaturation had been saturated.

29. The process of claim 25 wherein the hydrogenation was continued until at least 95% of the aliphatic unsaturation had been saturated.

30. The multi-arm or star polymer of claim 21 wherein the protecting group has been removed from the functional group.

31. The multi-arm or star polymer of claim 23 wherein the protecting group has been removed from the functional group.

32. The multi-arm or star polymer of claim 21 wherein the mole percentage of protected functional organolithium initiator in the total lithium initiator charge was between 2 and 98.

33. The product of claim 21 wherein the polyfunctional linking compounds were selected from the group comprising chlorosilanes, chlorostannanes, isomeric divinylbenzenes, isomeric diisopropenylbenzenes, isomeric trivinylbenzenes, isomeric divinylnaphthalenes, isomeric trivinylnaphthalenes, and 1,3,5-tris(1-phenylethenyl)benzene.

34. The multi-arm or star polymer of claim 21 wherein the conjugated alkadiene polymerized was butadiene, the alkyllithium was sec-butyllithium, the omega protected functional organolithium initiator was selected from the group consisting of 3-(1,1-dimethylethoxy)-1-propyllithium, chain extended with a conjugated alkadiene selected from butadiene, isoprene and alkenylsubstituted aromatics selected from styrene and alpha-methylstyrene, 3-(1,1-dimethylpropoxy)-1-propyllithium, chain extended with a conjugated alkadiene selected from butadiene, isoprene and alkenylsubstituted aromatics selected from styrene and alpha-methylstyrene, 3-(1,1-dimethylethylthio)-1-propyllithium, chain extended with a conjugated alkadiene selected from butadiene, isoprene and alkenylsubstituted aromatics selected from styrene and alpha-methylstyrene, 3-(dimethylamino)-1-propyllithium, chain extended with a conjugated alkadiene selected from butadiene, isoprene and alkenylsubstituted aromatics selected from styrene and alpha-methylstyrene, 3-(tert-butyldimethylsilylthio)-1-propyllithium and 3-(tert-butyldimethylsilyloxy)-1-propyllithium and the polyfunctional linking compound is selected from the group consisting of silicon tetrachloride, tin tetrachloride, isomeric diisopropenylbenzenes and isomeric divinylbenzenes.

35. The multi-arm or star polymer of claim 21 wherein the conjugated alkadiene polymerized was isoprene, the alkyllithium was sec-butyllithium, the protected functional organolithium initiator was selected from the group consisting of 3-(1,1-dimethylethoxy)-1-propyllithium, chain extended with isoprene, 3-(1,1-dimethylpropoxy)-1-propyllithium, chain extended with isoprene, 3-(1,1-dimethylethylthio)-1-propyllithium, chain extended with isoprene, 3-(dimethylamino)-1-propyllithium, chain extended with isoprene, 3-(tert-butyldimethylsilylthio)-1-propyllithium and 3-(tert-butyldimethylsilyloxy)-1 -propyllithium and the polyfunctional linking compound is selected from the group consisting of silicon tetrachloride, tin tetrachloride, isomeric diisopropenyl benzenes, and isomeric divinylbenzenes.

36. The multi-arm or star polymer of claim 21 wherein the mixture of conjugated alkadiene and alkenylaromatic compound polymerized by the alkyllithium consisted of butadiene and styrene, the alkyllithium initiator was sec-butyllithium, the protected functional initiator is selected from the group consisting of 3-(1,1-dimethylethoxy)-1-propyllithium, chain extended with a conjugated alkadiene selected from butadiene, isoprene and alkenylsubstituted aromatics selected from styrene and alpha-methylstyrene, 3-(1,1-dimethylpropoxy)-1-propyllithium, chain extended with a conjugated alkadiene selected from butadiene, isoprene and alkenylsubstituted aromatics selected from styrene and alpha-methylstyrene, 3-(1,1-dimethylethylthio)-1-propyllithium, chain extended with a conjugated alkadiene selected from butadiene, isoprene and alkenylsubstituted aromatics selected from styrene and alpha-methylstyrene, 3-(dimethylamino)-1-propyllithium, chain extended with a conjugated alkadiene selected from butadiene, isoprene and alkenylsubstituted aromatics selected from styrene and alpha-methylstyrene, 3-(tert-butyldimethylsilylthio)-1-propyllithium and 3-(tert-butyldimethylsilyloxy)-1-propyllithium, and the polyfunctional linking compound is selected from the group consisting of silicon tetrachloride, tin tetrachloride, isomeric diisopropenyl benzenes and isomeric divinylbenzenes.

37. The multi-arm or star polymer of claim 21 wherein the conjugated alkadiene and alkenylaromatic compound polymerized sequentially were butadiene and styrene, the alkyllithium initiator was sec-butyllithium, the protected functional initiator was selected from the group consisting of 3-(1,1-dimethylethoxy)-1-propyllithium, chain extended with a conjugated alkadiene selected from butadiene, isoprene and alkenylsubstituted aromatics selected from styrene and alpha-methylstyrene, 3-(1,1-dimethylpropoxy)-1-propyllithium, chain extended with a conjugated alkadiene selected from butadiene, isoprene and alkenylsubstituted aromatics selected from styrene and alpha-methylstyrene, 3-(1,1-dimethylethylthio)-1-propyllithium, chain extended with a conjugated alkadiene selected from butadiene, isoprene and alkenylsubstituted aromatics selected from styrene and alpha-methylstyrene, 3-(dimethylamino)-1-propyllithium, chain extended with a conjugated alkadiene selected from butadiene, isoprene and alkenylsubstituted aromatics selected from styrene and alpha-methylstyrene, 3-(tert-butyldimethylsilylthio)-1-propyllithium, and 3-(tert-butyldimethylsilyloxy)-1-propyllithium, and the polyfunctional linking compound is selected from the group consisting of silicon tetrachloride, tin tetrachloride, isomeric diisopropenyl benzenes and isomeric divinylbenzenes.

38. The multi-arm or star polymer of claim 21 wherein the mixture of conjugated alkadiene and alkenylaromatic compound polymerized by the alkyllithium consisted of isoprene and styrene, the alkyllithium initiator was sec-butyllithium, the protected functional initiator was selected from the group consisting of 3-(1,1-dimethylethoxy)-1-propyllithium, chain extended with a conjugated alkadiene selected from butadiene, isoprene and alkenylsubstituted aromatics selected from styrene and alpha-methylstyrene, 3-(1,1-dimethylpropoxy)-1-propyllithium, chain extended with a conjugated alkadiene selected from butadiene, isoprene and alkenylsubstituted aromatics selected from styrene and alpha-methylstyrene, 3-(1,1-dimethylethylthio)-1-propyllithium, chain extended with a conjugated alkadiene selected from butadiene, isoprene and alkenylsubstituted aromatics selected from styrene and alpha-methylstyrene, 3-(dimethylamino)-1-propyllithium, chain extended with a conjugated alkadiene selected from butadiene, isoprene and alkenylsubstituted aromatics selected from styrene and alpha-methylstyrene, 3-(tert-butyldimethylsilylthio)-1-propyllithium and 3-(tert-butyldimethylsilyloxy)-1-propyllithium, and the polyfunctional linking compound was selected from the group consisting of silicon tetrachloride, tin tetrachloride, isomeric diisopropenylbenzenes and isomeric divinylbenzenes.

39. The multi-arm or star polymer of claim 21 wherein the conjugated alkadiene and alkenylaromatic compound polymerized sequentially were isoprene and styrene, the alkyllithium initiator was sec-butyllithium, the protected functional initiator was selected from the group consisting of 3-(1,1-dimethylethoxy)-1-propyllithium, chain extended with a conjugated alkadiene selected from butadiene, isoprene and alkenylsubstituted aromatics selected from styrene and alpha-methylstyrene, 3-(1,1-dimethylpropoxy)-1-propyllithium, chain extended with a conjugated alkadiene selected from butadiene, isoprene and alkenylsubstituted aromatics selected from styrene and alpha-methylstyrene, 3-(1,1-dimethylethylthio)-1-propyllithium, chain extended with a conjugated alkadiene selected from butadiene, isoprene and alkenylsubstituted aromatics selected from styrene and alpha-methylstyrene, 3-(dimethylamino)-1-propyllithium, chain extended with a conjugated alkadiene selected from butadiene, isoprene and alkenylsubstituted aromatics selected from styrene and alpha-methylstyrene, 3-(tert-butyldimethylsilylthio)-1-propyllithium and 3-(tert-butyldimethylsilyloxy)-1-propyllithium, and the polyfunctional linking compound is selected from the group consist- 40. The multi-arm or star polymer of claim 21 wherein the conjugated alkadiene being polymerized was butadiene, the alkyllithium initiator was n-butyllithium, the protected functional initiator was selected from the group consisting of 3-(1,1-dimethylethoxy)-1-propyllithium, chain extended with a conjugated alkadiene selected from butadiene, isoprene and alkenylsubstituted aromatics selected from styrene and alpha-methylstyrene, 3-(1,1-dimethylpropoxy)-1-propyllithium, chain extended with a conjugated alkadiene selected from butadiene, isoprene and alkenylsubstituted aromatics selected from styrene and alpha-methylstyrene, 3-(1,1-dimethylethylthio)-1-propyllithium, chain extended with a conjugated alkadiene selected from butadiene, isoprene and alkenylsubstituted aromatics selected from styrene and alpha-methylstyrene, 3-(dimethylamino)-1-propyllithium, chain extended with a conjugated alkadiene selected from butadiene, isoprene and alkenylsubstituted aromatics selected from styrene and alpha-methylstyrene, 3-(tert-butyldimethylsilylthio)-1-propyllithium and 3-(tert-butyldimethylsilyloxy)-1-propyllithium, and the polyfunctional linking compound is selected from the group consisting of silicon tetrachloride, tin tetrachloride, isomeric diisopropenylbenzenes and isomeric divinylbenzenes.

41. The product of claim 1, wherein the protecting groups at the terminus of each functional multi-arm or star polymer arm are removed by acidic deprotection.

42. The product of claim 41, where the hydroxyl functional groups are further reacted with diisocyanates and diols to produce polyurethane blocks as the outer segments of the functional multi-arm or star polymer arms.

43. The product of claim 42, wherein part of the diol is substituted with an acid functional diol and such acid groups further neutralized with tertiary amines to provide dispersibility in water.

44. The product of claim 43 wherein the acid functional diol is dimethylolpropionic acid.

45. The product of claim 41, wherein the hydroxyl functional groups are further reacted with compounds selected from diacids, anhydrides, diamines and lactams to produce polyamide blocks as the outer segments of the functional multi-arm or star polymer arms.

46. The product of claim 45 wherein part of the diacid or anhydride is substituted by an unsaturated acid or anhydride which produces unsaturated polyester blocks capable of crosslinking with unsaturated monomers such as styrene by addition of free radical initiators.

47. The product of claim 46, wherein the unsaturated acid or anhydride is selected from fumaric acid or maleic anhydride.

48. The product of claim 47, wherein the hydroxyl groups are further reacted with an anhydride to form a half-ester with free carboxyl functionality at the terminus of each functional polymer arm.

49. The product of claim 48, wherein the carboxyl functional terminal groups are further reacted with epoxy resins and amine curing agents to form toughened epoxy resin composites.

50. The product of claim 41, wherein the hydroxyl functional groups are reacted with methacryloyl chloride to form stars with polymerizable alkenyl groups at the terminus of each functional polymer arm.

51. The product of claim 50, wherein acrylic monomers are polymerized, by use of free radical initiators, onto the alkenyl terminal groups at the terminus of each functional polymer star arm.

52. The product of claim 51, wherein acid functional or amide functional acrylic monomers, are used and which result in polar hydrophilic polymer segments at the end of each functional star polymer arm.

53. The product of claim 50, wherein sulfonated styrene and/or 4-vinyl pyridine are polymerized by free radical initiators onto the terminal alkenyl groups at the terminus of each functional polymer star arm, producing functional polymer segments capable of improving dispersability of the star polymers in lubricating oils.

54. The product of claim 41, wherein the hydroxyl functional groups are reacted with sulfonyl chloride, along with a tertiary amine catalyst, to form sulfonate functional groups at the terminus of each functional polymer star arm.

55. The product of claim 54, wherein the sulfonate terminated arms of the stars are reacted with primary amines or ammonia, under heat and pressure, to form star polymers with amine functionality at the terminus of each functional polymer star arm.

56. The product of claim 48, wherein the carboxyl functional star polymer is reacted with an epoxy resin and an excess of amine to completely react all of the epoxy groups, the excess amine is removed by distillation, and the resulting epoxy-amine adduct is reacted with a water soluble organic or inorganic acid to form water soluble quarternary ammonium containing polymers.

57. The product of claim 4 or 5, wherein the protecting groups at the terminus of each functional arm are removed by acidic deprotection.

58. The products of claim 57, wherein the hydroxyl functional groups are further reacted with diisocyanates and diols to produce polyurethane blocks as the outer segments of the functional star polymer arms.

59. The products of claim 58, wherein part of the diol is substituted with an acid functional diol and such acid groups further neutralized with tertiary amines to provide dispersibility in water.

60. The products of claim 59, wherein the acid functional diol is dimethylolpropionic acid.

61. The products of claim 57, wherein the hydroxyl functional groups are further reacted with compounds selected from the group of diacids, anhydrides, diamines and lactams to produce polyamide blocks as the outer segments of the functional star polymer arms.

62. The products of claim 61, wherein part of the diacid or anhydride is substituted by an unsaturated acid or anhydride which produces unsaturated polyester blocks capable of crosslinking with unsaturated monomers such as styrene by addition of free radical initiators.

63. The products of claim 62, wherein the unsaturated acid or anhydride is selected from fumaric acid and maleic anhydride.

64. The products of claim 57, wherein the hydroxyl groups are further reacted with an anhydride to form a half-ester with free carboxyl functionality at the terminus of each functional star polymer arm.

65. The products of claim 64, wherein the carboxyl functional terminal groups are further reacted with epoxy resins and amine curing agents to form toughened epoxy resin composites.

66. The products of claim 57, wherein the hydroxyl functional groups are reacted with methacryloyl chloride to form stars with polymerizable alkenyl groups at the terminus of each functional polymer star arm.

67. The products of claim 66, wherein acrylic monomers are polymerized, by use of free radical initiators, onto the alkenyl terminal groups at the terminus of each functional polymer star arm.

68. The products of claim 67, wherein acid functional or amide functional acrylic monomers, such as acrylic acid or methacrylic acid, are used and which result in polar hydrophilic polymer segments at the end of each functional star polymer arm.

69. The products of claim 68, wherein sulfonated styrene and/or 4-vinyl pyridine are polymerized by free radical initiators onto the terminal alkenyl groups at the terminus of each polymer star arm, producing functional polymer segments capable of improving dispersability of the star polymers in lubricating oils.

70. The products of claim 67, wherein the hydroxyl functional groups are reacted with sulfonyl chloride, along with a tertiary amine catalyst, to form sulfonate functional groups at the terminus of each functional polymer star arm.

71. The products of claim 70, wherein the sulfonate terminated arms of the stars are reacted with primary amines or ammonia, under heat and pressure, to form star polymers with amine functionality at the terminus of each functional polymer star arm.

72. The products of claim 64, wherein the carboxyl functional star polymer is reacted with an epoxy resin and an excess of amine to completely react all of the epoxy groups, the excess amine is removed by distillation, and the resulting epoxy-amine adduct is reacted with a water soluble organic or inorganic acid to form water soluble quarternary ammonium containing polymers.

73. The product of claim 1 where in the protic terminating agent was selected from water or alcohol.

74. The process of claim 21 wherein the element of group IVa is selected from carbon and silicon.

75. The product of claim 52 wherein the amide functional acrylic monomer is selected from acrylic and methacrylic acids.

76. The polymer of claim 1, wherein T is oxygen and A is carbon.

77. The polymer of claim 21, wherein T is oxygen and A is carbon.

78. A multi-branched or star-shaped polymer having mixed functional and non-functional ends produced by a process comprising:

polymerizing at least one monomer selected from the group consisting of conjugated alkadienes, alkenylaromatic compounds, and mixtures thereof, with mixtures of (a) at least one alkyllithium initiator and (b) at least one protected functional organolithium initiator of the formula

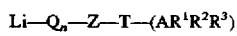

wherein:

Q is an unsaturated hydrocarbyl group derived by incorporation of at least one compound selected from the group consisting of conjugated diene hydrocarbons, alkenylaromatic compounds, and mixtures thereof;

n is an integer from 0 to 5;

Z is a branched or straight chain hydrocarbyl connecting group containing 3–25 carbon atoms;

T is oxygen;

$(A-R^1R^2R^3)$ is a protecting group in which A is carbon and $R^1$, $R^2$, and $R^3$ are independently selected from the group consisting of hydrogen, alkyl, substituted alkyl groups containing lower alkyl, lower alkylthio, or lower dialkylamino groups, aryl, substituted aryl groups containing lower alkyl, lower alkylthio, or lower dialkylamino groups, cycloalkyl and substituted cycloalkyl groups containing 5–12 carbon atoms, to produce protected living polymer anions;

reacting the living polymer anions with a polyfunctional linking agent to produce multi-arm star polymers;

removing the protecting group $A-R^1R^2R^3$ to produce functionalized multichelic multi-arm or star polymers with hydroxyl groups on the end of some of the arms of the multi-arm or star polymer; and reacting the hydroxyl groups with at least one comonomer to produce a block copolymer.

79. A multi-branched or star-shaped polymer having mixed functional and non-functional ends produced by a process comprising:

polymerizing at least one monomer selected from the group consisting of conjugated alkadienes, alkenylaromatic compounds, and mixtures thereof, separately with (a) at least one alkyllithium initiator and (b) at least one protected functional organolithium initiator of the formula

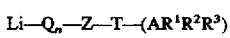

wherein:

Q is an unsaturated hydrocarbyl group derived by incorporation of at least one compound selected from the group consisting of conjugated diene hydrocarbons, alkenylaromatic compounds, and mixtures thereof;

n is an integer from 0 to 5;

Z is a branched or straight chain hydrocarbyl connecting group containing 3–25 carbon atoms;

T is oxygen;

$(A-R^1R^2R^3)$ is a protecting group in which A is carbon and $R^1$, $R^2$, and $R^3$ are independently selected from the group consisting of hydrogen, alkyl, substituted alkyl groups containing lower alkyl, lower alkylthio, or lower dialkylamino groups, aryl, substituted aryl groups containing lower alkyl, lower alkylthio, or lower dialkylamino groups, cycloalkyl and substituted cycloalkyl groups containing 5–12 carbon atoms, to produce protected living polymer anions;

reacting the living polymer anions with a polyfunctional linking agent to produce multi-arm star polymers;

removing the protecting group $A-R^1R^2R^3$ to produce functionalized multichelic multi-arm or star polymers with hydroxyl groups on the end of some of the arms of the multi-arm or star polymer; and reacting the hydroxyl groups with at least one comonomer to produce a block copolymer.

* * * * *

UNITED STATES PATENT AND TRADEMARK OFFICE
CERTIFICATE OF CORRECTION

PATENT NO.  : 5,798,418
DATED       : August 25, 1998
INVENTOR(S) : Quirk

It is certified that error appears in the above-identified patent and that said Letters Patent is hereby corrected as shown below:

Column 29, line 34, "1alkyllithiums" should be --1-alkyllithiums--.

Column 35, line 16, "claim 67" should be --claim 57--.

Signed and Sealed this

Twenty-sixth Day of January, 1999

Attest:

Attesting Officer

Acting Commissioner of Patents and Trademarks

UNITED STATES PATENT AND TRADEMARK OFFICE
CERTIFICATE OF CORRECTION

PATENT NO. : 5,798,418
DATED : August 25, 1998
INVENTOR(S) : Quirk

It is certified that error appears in the above-identified patent and that said Letters Patent is hereby corrected as shown below:

On the title page: Item [56] Reference Cited: Foreign Patent Documents:

WO 95/22566         WIPO
    2 144 430           United Kingdom

Signed and Sealed this

Thirtieth Day of March, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,798,418
DATED : August 25, 1998
INVENTOR(S) : Quirk

It is certified that error appears in the above-identified patent and that said Letters Patent is hereby corrected as shown below:

On the title page, insert the following:

--[60]-- Provisional Application No. 60/001,687, July 31, 1995--.

Signed and Sealed this

Fifteenth Day of June, 1999

Attest:

Attesting Officer

Q. TODD DICKINSON

Acting Commissioner of Patents and Trademarks